Nov. 5, 1935.  E. W. BURGESS  2,020,017

METALLIC GRID

Filed July 18, 1931

INVENTOR.

Edward W. Burgess

BY

ATTORNEY.

Patented Nov. 5, 1935

2,020,017

UNITED STATES PATENT OFFICE 2,020,017

METALLIC GRID

Edward W. Burgess, Milwaukee, Wis., assignor to A. O. Smith Corporation, Milwaukee, Wis., a corporation of New York Application July 18, 1931, Serial No. 551,659

5 Claims. (Cl. 94—8)

This invention relates to metallic grids which are adapted to be embedded in concrete or similar flooring or pavement and constitutes an improvement over the invention disclosed in my former Patent No. 1,765,652.

In the drawing, wherein like reference characters indicate like parts throughout the several views.

Figure 1:
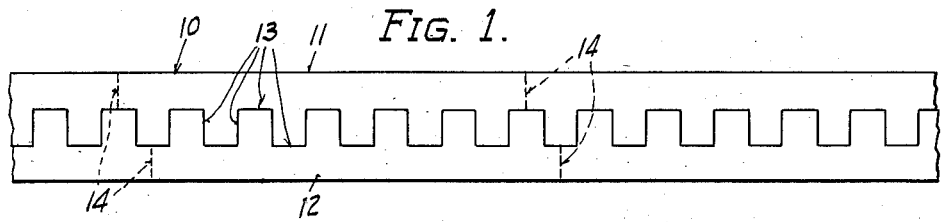
Figure 1 is a plan view of a ribbon of sheet metal from which strips are cut to be subsequently formed into the wear-resistant ring members of the grid.
Figure 2:
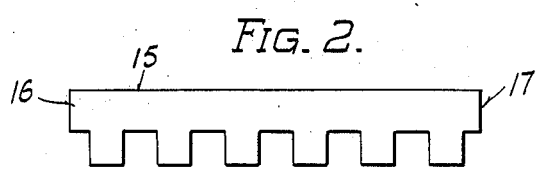
Fig. 2 is a view of a strip from which an individual ring member is made.

According to the present invention, a flat strip or ribbon 10 of metal is cut into two strips 11 and 12 along the crenelated line 13. The strips 11 and 12 are then severed at predetermined intervals along lines such as indicated by the numeral 14, thus forming strips 15 such as indicated in Fig. 2 from which an individual wear-resistant ring member is made.

Figure 3:
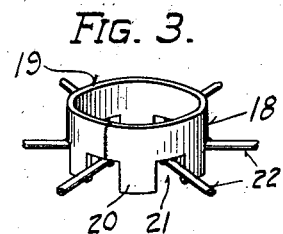
Fig. 3 is a perspective view of one of the finished ring members.

The strip 15 may be bent or rolled and the ends united to provide an endless member of the desired shape. In the embodiment of the invention shown in Fig. 3, the strip 15 is rolled into a ring 18 and the ends 16 and 17 are welded together in abutting relation preferably by electrical resistance welding. The ring thus formed has an upper edge 19 lying in a single plane and a lower toothed edge formed by the teeth or tongues 20 and recesses 21. If the plate from which the member 18 is made is heavy enough, the ends may not be welded or united in any way.

Figure 4:
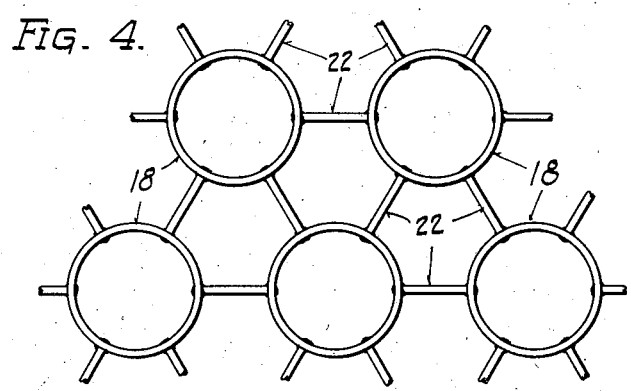
Fig. 4 is a plan view of portion of the completed grid.

A plurality of rings 18 are then joined together by means of short connecting wires 22 in uniformly spaced relation. In securing the rings together, the wires 22 are welded to the lower edge of the cup 18 at substantially the center of the recesses 21. This welding is also preferably accomplished by means of electrical resistance welding. In Fig. 4 the rings 18 of the finished grid are shown in parallel rows, the individual rings of succeeding rows being staggered with respect to the rings of the preceding row. However, it is to be understood that any other arrangement of the rings may be made.

Figure 5:
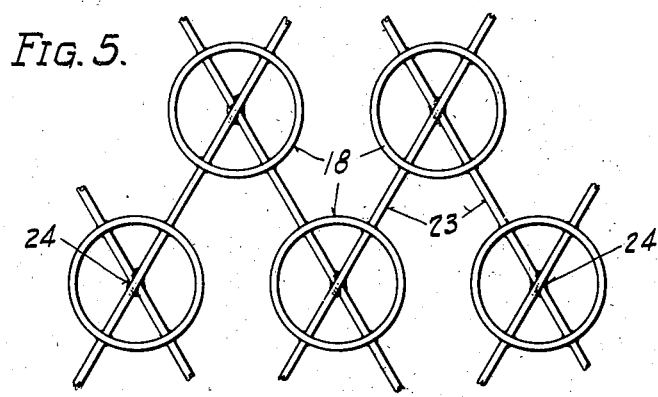
Fig. 5 is a similar view of a modified form.

In the modification of the grid shown in Fig. 5, the ring members 18 are formed in the same manner as those in Fig. 4. However, the cups in this modification are secured together by wire netting 23. The wire netting 23 is formed by welding the strands of the netting together at their crossing points 24. This is preferably accomplished by electric resistance welding, and at the time of the welding sufficient pressure is exerted upon the wires to bring the same into substantially the same plane. After the formation of the netting, rings 18 are positioned upon the netting with their axes disposed substantially at the crossing points 24 of the strands of the netting and with the strands of the wire disposed at the center of the recesses 21 in the lower edge of the rings. When so positioned, the rings are welded to the wire netting by means of electric resistance welding.

In use the grid is embedded in the concrete or other material of the pavement in such position that the upper faces 19 of the rings are substantially flush with the tread surface of the pavement, the faces thereby functioning to increase the wear-resistant qualities of the tread surface. The lower toothed configuration of the rings is provided to enhance the bond between the rings of the grid and the paving material when the grid is embedded therein.

Grids made according to either of the above described methods are much more economical of manufacture than the grids described in my former patent since the waste incidental to the manufacture of the grid according to said patent is entirely eliminated.

Having thus described the invention, what is claimed and desired to be secured by Letters Patent is:

1. A paving grid adapted to be embedded in paving material for reenforcing the same and providing a wear-resistant tread surface comprising a plurality of spaced metallic ring-shaped members, the lower edges of which are provided with a plurality of downwardly extending tongues, and metallic connecting members extending across the spaces between said ring-shaped members and welded to the lower edges of said ring-shaped members between said tongues for joining said ring-shaped members together in predetermined spaced relation.

2. A paving grid adapted to be embedded in paving material for reenforcing the same and providing a wear-resistant tread surface comprising a plurality of spaced sheet metal ring-shaped members, the lower edges of which are provided with a plurality of downwardly extending tongues, and wires extending across the spaces between said members and welded to the lower edges of said ring-shaped members between said tongues for joining said ring-shaped members together in predetermined spaced relation.

3. A paving grid comprising a plurality of spaced ring-shaped members, the upper edge of each of said members lying in a single plane and the lower edge thereof being provided with tongues, and connecting wires extending across the spaces between said members and welded to the lower edges of said ring-shaped members between said tongues for joining said ring-shaped members together in uniformly spaced relation.

4. A grid for setting in paving material comprising, in combination, a plurality of spaced ring-shaped members, said members being notched in one end, and connecting members, extending across the spaces between said first named members, disposed in the notches and welded to the ring-shaped members to retain them in spaced relation providing a structure in which the upper edges of the ring-shaped members lie in a common plane to form part of the tread surface when set in paving material.

5. A grid for setting in paving material comprising, in combination, a plurality of spaced sheet metal ring-shaped members, said members having their lower ends notched, connecting members, extending across the spaces between said first named members, disposed with their ends in the notches and welded to the ring-shaped members to retain them in spaced relation with their upper edges lying in the same common plane to provide a structure for enclosing portions of the paving material to support it and to form part of the tread surface when set in the paving material.

EDWARD W. BURGESS.